Aug. 14, 1934.　　　C. W. ZEHNBAUER　　　1,970,159
AUTOMOBILE TIRE SKATE
Filed April 28, 1933　　　2 Sheets-Sheet 1
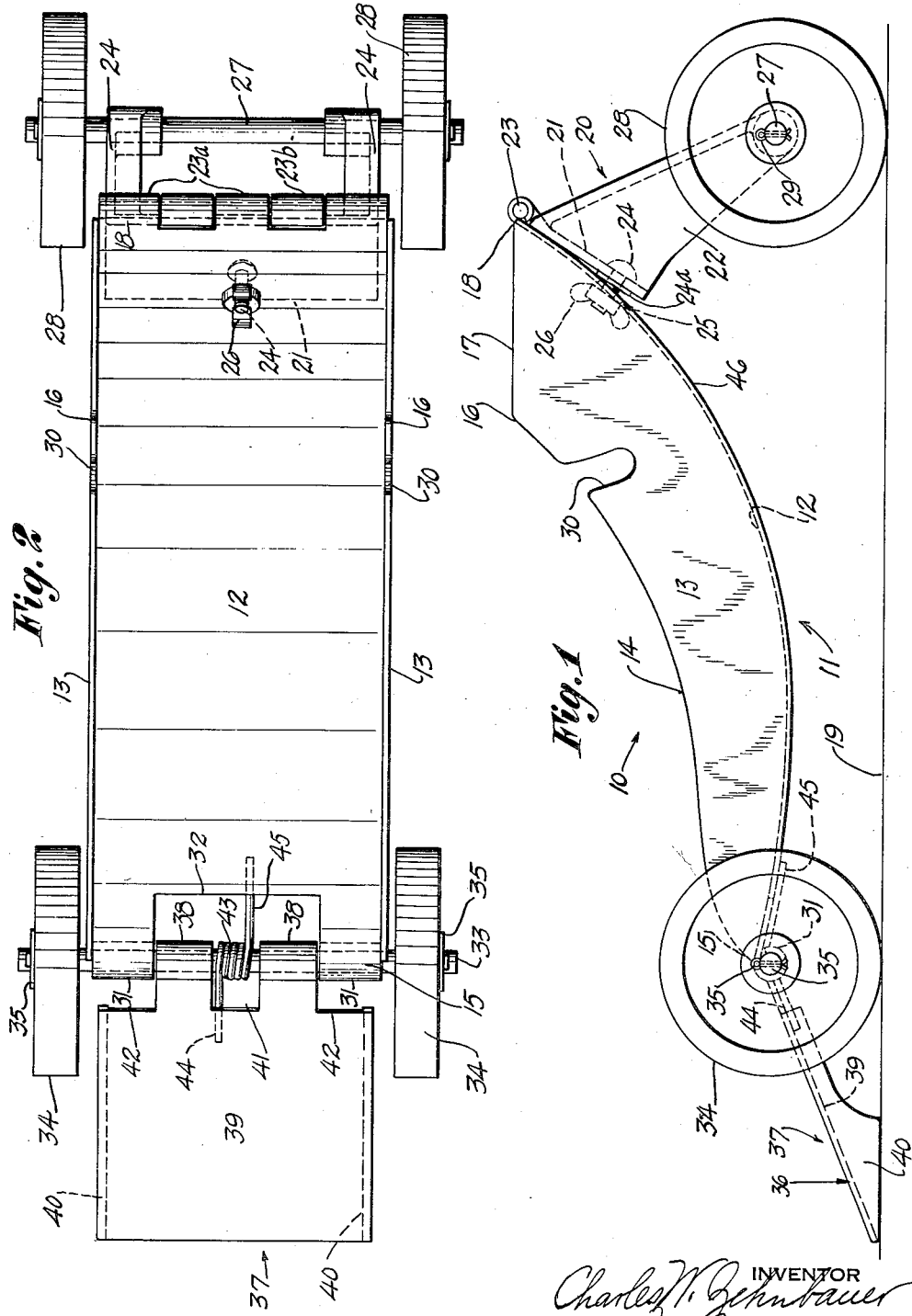

Aug. 14, 1934.    C. W. ZEHNBAUER    1,970,159
AUTOMOBILE TIRE SKATE
Filed April 28, 1933    2 Sheets-Sheet 2
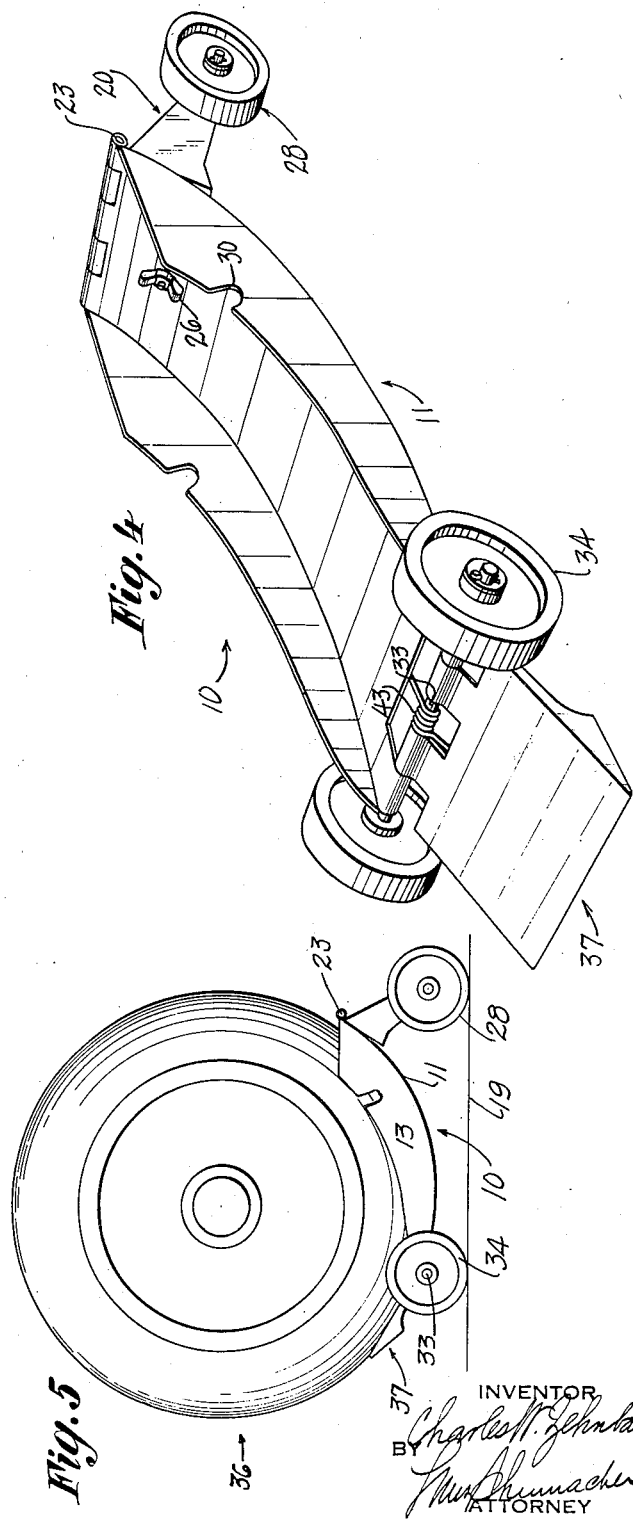
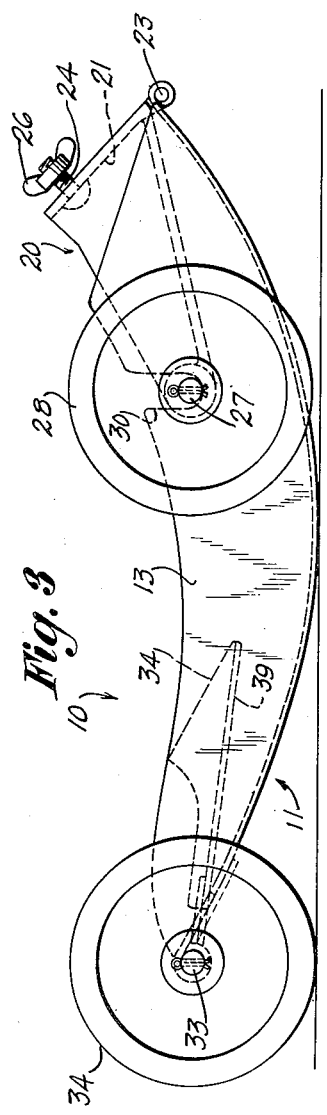

Patented Aug. 14, 1934

1,970,159

UNITED STATES PATENT OFFICE 1,970,159

AUTOMOBILE TIRE SKATE

Charles W. Zehnbauer, Belleville, N. J.

Application April 28, 1933, Serial No. 668,337

6 Claims. (Cl. 280—61)

This invention relates to devices such as automobile tire skates.

One object of the invention is to provide a device of the character described, having improved means for engaging and supporting an automobile wheel the tire whereof has accidentally become deflated.

Another object of the invention is to furnish a device of the nature set forth having a tail piece and improved means for actuating the same.

Another object of the invention is the provision of a device of the type mentioned and which is of improved collapsible construction.

A further object of the invention is to afford a device of the class alluded to having few and simple parts, and which is inexpensive in construction, convenient in use, durable, reliable, and efficient in use to a high degree.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Figure 1 is a view in side elevation of a device embodying the invention, showing the same in open position.

Fig. 2 is a top plan view thereof.

Fig. 3 is a view in side elevation of the same in collapsed position.

Fig. 4 is a perspective view of the device.

Fig. 5 is a side view on a reduced scale showing a typical application of the invention.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawings, therefore, is submitted merely as showing the preferred exemplification of the invention.

Generally described, this invention relates to automobile tire skates, and provides a device which can be instantly and quickly applied to a wheel if a puncture in a tire occurs at a point remote from a service station. Under those circumstances, due to bad weather or otherwise, it is often very inconvenient for the operator himself to attempt to replace the tire, especially if the weather or road conditions be unfavorable. By my invention, the tire skate is opened up from its compact collapsed condition and set in operative position, and thereafter placed on the ground in front of the wheel having the punctured tire. Finally, the power is applied by the motor to cause the said wheel to run up on the skate, whereon it is held without any further manipulation being required. In this manner the automobile may be driven at a fair rate of speed and for a considerable distance to a service station at which the punctured tire can be replaced.

Referring in detail to the drawings, 10 denotes a device embodying the invention. The same may include a main shoe 11 for an automobile wheel, said shoe having a curved bottom wall 12 and longitudinally extending side walls 13 that may be in upstanding relation thereto. The side walls or flanges may have their upper edges 14 conforming generally to the curvature of the bottom wall, but may gradually diverge therefrom beginning at the rear end 15 of the main shoe body and extending toward a point 16, from which said edges incline at 17 toward the front end of the main shoe body at 18. The latter may preferably be of one piece construction, and may be made as a sheet metal stamping or as a casting.

Suitable wheeled means are provided for supporting the main shoe body with its forward end 18 at a higher elevation above the ground surface 19 than its rear end 15, whereby a wheel seated in the shoe is self retained therein. Moreover, in order to afford collapsibility of the device, a bracket of generally U shaped inverted form such as 20, having a wall 21 provided with spaced side arms 22 may be hingedly connected at its forward end portion to the front end of the shoe at 23, the walls 12 and 21 having suitable registering knuckles 23a and 23b through which a pintle is passed at 23. Releasable fastening means may interconnect the bracket 20 with the main shoe body, such as a short bolt 24 permanently connected to the wall 21, and adapted to be passed through a hole or slot 25 in the wall 12, and to be engaged by a wingnut 26. If desired, adjustment in the relation of the bracket 20 to the shoe may be obtained, as by interposing washers 24a therebetween, said washers extending around the bolt 24.

Journaled in the arms 22 is a shaft 27, on which may be journaled one or more wheels 28, that may be removably retained on the shaft as by cotter pins 29. The distance between the wheels 28 may be greater than the outside distance between the side walls 13, and the width of the bracket 20 may be substantially less than said distance, so that the bracket 20 and its wheels, which are swingable about the axis 23, upon releasing the nut 26, may assume the position shown in Fig. 3, with the bracket lying between the side walls 13, and the wheels externally thereof. To permit a maximum degree of collapse, the side walls 13 may have notches 30 at their upper edges for accommodating the portions of the shaft 27 which lie between the wheels and the arms 22.

In proximity to the rear end of the shoe 11, the latter may have a plurality of downwardly extending knuckles 31 which may be formed integrally with the main shoe. Separating these knuckles 31, which are disposed at the sides of the shoe, is an intermediate cutout 32 in the wall 12, for a purpose hereinafter described. Extending through said knuckles is a shaft 33 on which wheels 34 may be journaled at the outside of the side walls 13, and removably retained on said shaft as by cotter pins 35. The rear wheels 34 may be of any desired size but are preferably of the same diameter as the front wheels 28 which support the front end of the shoe or cradle at a higher elevation than the rear end thereof, by virtue of the bracket 20.

In order to facilitate the movement of an automobile wheel such as 36 onto the main shoe 11, the latter may have a rear end tail piece or auxiliary shoe 37. Said auxiliary shoe 37 may have at the forward end thereof spaced alined downward extending knuckles 38 adapted to be disposed between the knuckles 31, with the shaft 33 passing through the knuckles 38, whereby the auxiliary shoe is hingedly connected to the main shoe at the rear end 15 of the latter. From the hinge connection, the auxiliary shoe may have an upper wall or runway 39 downwardly and rearwardly inclined to the ground surface 19, and if desired, the auxiliary shoe may also have side flanges 40, portions of which are adapted to rest on the ground. The width of the auxiliary shoe is such as to permit it to swing into the main shoe between the side flanges 13 thereof as shown in Fig. 3, and in order to facilitate a substantially full collapsing movement, the wall 39 may have a cutout 41 between the knuckles 38, and side cutouts 42, which in cooperation with cutout 32 afford the requisite clearance for the desired swinging motion.

In order to normally urge the auxiliary shoe 37 upward above the ground surface 19, any suitable means such as a spring 43 acts between the shoe portions 11 and 37. This spring may be coiled about the shaft 33 in the cutout 41 and may have its end portions 44, 45 bearing upward on the underside of the walls 12 and 39.

The manner of using the device will now be described. The device being in the collapsed position shown in Fig. 3, the bracket 20 is swung outwardly, with the screw 24 moving upward into the slot 25, whereupon the thumbnut 26 may be applied to lock the bracket. The device is then placed on the ground in front of the wheel 36 having the deflated tire, and the tail piece or auxiliary shoe 37 swung outwardly to engage under the wheel, whereby the auxiliary shoe is thus retained against the force of the spring 43. Then the automobile is driven forward causing the wheel 36 to ride up the auxiliary shoe 37 and onto the main shoe 11, between the side flanges 13 thereof. In this position, the axis of the wheel 36 will lie between the wheels 28 and 34, but preferably in closer relation to the latter than to the former, so that the wheels 34 carry the greater part of the load. In this regard, it will be noted that the shoe 11 has its region of lowest elevation in relative proximity to the rear wheels 34. The thumbnut 26 may be substantially out of contact with the tire, and in any case, may be made sufficiently low and flat so as not to damage the tire. In actual practise, I have found it sufficient for satisfactory operation of the device that the wheel 36 shall bear forward on the wall 12 at a point not further front than 46. As soon as the wheel leaves the auxiliary shoe 37, the same is released thereby and wings upward off the ground as shown in Fig. 5. Since the spring 43 may be relatively powerful, the auxiliary shoe 37 may aid in retaining the wheel 36 on the device, and preclude the wheel from accidentally moving rearward off the main shoe 11. With the transmission for the wheel 36 idling, the automobile may now be driven forward in a reliable manner, and at a fair rate of speed, the wheel 36 being stationarily carried by the device 10. Thus the car may be conveniently driven to a service station for repair or replacement of the defective tire of the wheel 36. On arriving at the service station, the car may be merely backed up, or the device 10 may be held stationary while this occurs, so that the wheel 36 moves rearward and down the auxiliary shoe 37, which is depressed by said wheel to contact the ground. Upon being released, the auxiliary shoe swings to the position of Fig. 3, the thumbnut 26 is removed, and the bracket 20 swung upward and rearward so that the device, now fully collapsed, can be readily stored away among the tools of the car.

The device 10 is inexpensive to manufacture, since the main shoe 11 may be of one piece construction. Inasmuch as the auxiliary shoe 37 and the spring 43, as well as the rear wheels 34 are all mounted on the same shaft 33, these parts may be rapidly assembled in one operation. Moreover, shafts 27 and 33 may be removable.

It will be appreciated that various changes and modifications may be made in the device as shown in the drawings, and that the same is submitted in an illustrative and not in a limiting sense, the scope of the invention being defined in the following claims.

I claim:

1. An automobile wheel tire skate including a shoe having a bottom wall having its forward end at a higher elevation than its rear end, wheel means adjacent to the front and rear ends of the shoe for supporting the same, and a bracket for mounting the front end wheel means, said bracket being hingedly connected to said shoe so as to swing about a horizontal transverse axis upon said shoe into collapsed position or under the shoe for supporting the same, said bracket having a large bearing means for engaging the underside of said bottom wall rearward of the hinge connection, and means for releasably maintaining the bracket in the supporting position.

2. An automobile tire skate including a shoe upwardly inclined from the rear to the front thereof, a hinge extending along the front end of said shoe transversely thereof, a bracket connected at its forward end with said hinge and adapted to underlie the front upwardly extending end portion of the shoe, means for connecting the bracket to the shoe to maintain the same in the said position, said means being releasable to permit the bracket to be swung upon the shoe, and wheel means connected to the rear end of the shoe.

3. An automobile wheel tire skate including a shoe upwardly inclined toward the front end thereof, a bracket hingedly connected to said shoe for swinging into positions to overlie and underlie said shoe, means for releasably connecting said bracket to the shoe to maintain the former in shoe underlying position, wheel means mounted on said bracket, and other wheel means connected to the rear end portion of the shoe.

4. An automobile wheel tire skate including a shoe, a bracket hingedly connected to the shoe at one end thereof, wheel means mounted on the bracket, wheel means at the opposite end of the shoe supporting the latter end of the shoe at a lower elevation than that of the first mentioned end thereof, a runway tail piece at said opposite end of the shoe hingedly connected thereto, said bracket and tail piece being swingable toward each other about their respective hinge connections to overlie the shoe.

5. An automobile wheel tire skate having a shoe inclined upwardly toward the front end thereof, said shoe being elongated and having upstanding side flanges extending along the length thereof, a bracket adapted to underlie and support the inclined front end of the shoe, a hinge interconnecting the front end of the shoe with the front end of the bracket, means for releasably connecting the bracket with the shoe to maintain the same in shoe underlying position, said hinge having its axis at right angles to the length of the shoe whereby the bracket is upwardly swingable to overlie the shoe between the side flanges thereof, wheel means connected to the bracket for supporting the same on the ground, wheel means connected to the rear end of the shoe for supporting the same, a runway tail means, a hinge interconnecting the latter with the shoe and having an axis parallel to the first mentioned axis so that the tail piece is upwardly swingable to overlie the shoe and be disposed between the side flanges thereof.

6. An automobile wheel tire skate including a shoe, wheel means for supporting the shoe at the ends thereof, and means interposed between the shoe and the front wheel means for supporting the front end of the shoe at a higher elevation than the rear end thereof, said means being movable relatively to said shoe, so as to overlie the same, a shaft for mounting the front end wheel means on said movable means, said shoe having side walls for engaging an automobile wheel seated on the shoe, the side walls having openings for receiving portions of the shaft in the said overlying position of the movable means.

CHARLES W. ZEHNBAUER.